3,403,418
PIPELINE PIG OR SWIPE
Mary M. Knapp, 1209 Hardy St. 77020, and Harry J.
Girard, 1947 W. Gray 77019, both of Houston, Tex.
Filed Oct. 7, 1966, Ser. No. 585,157
5 Claims. (Cl. 15—104.06)

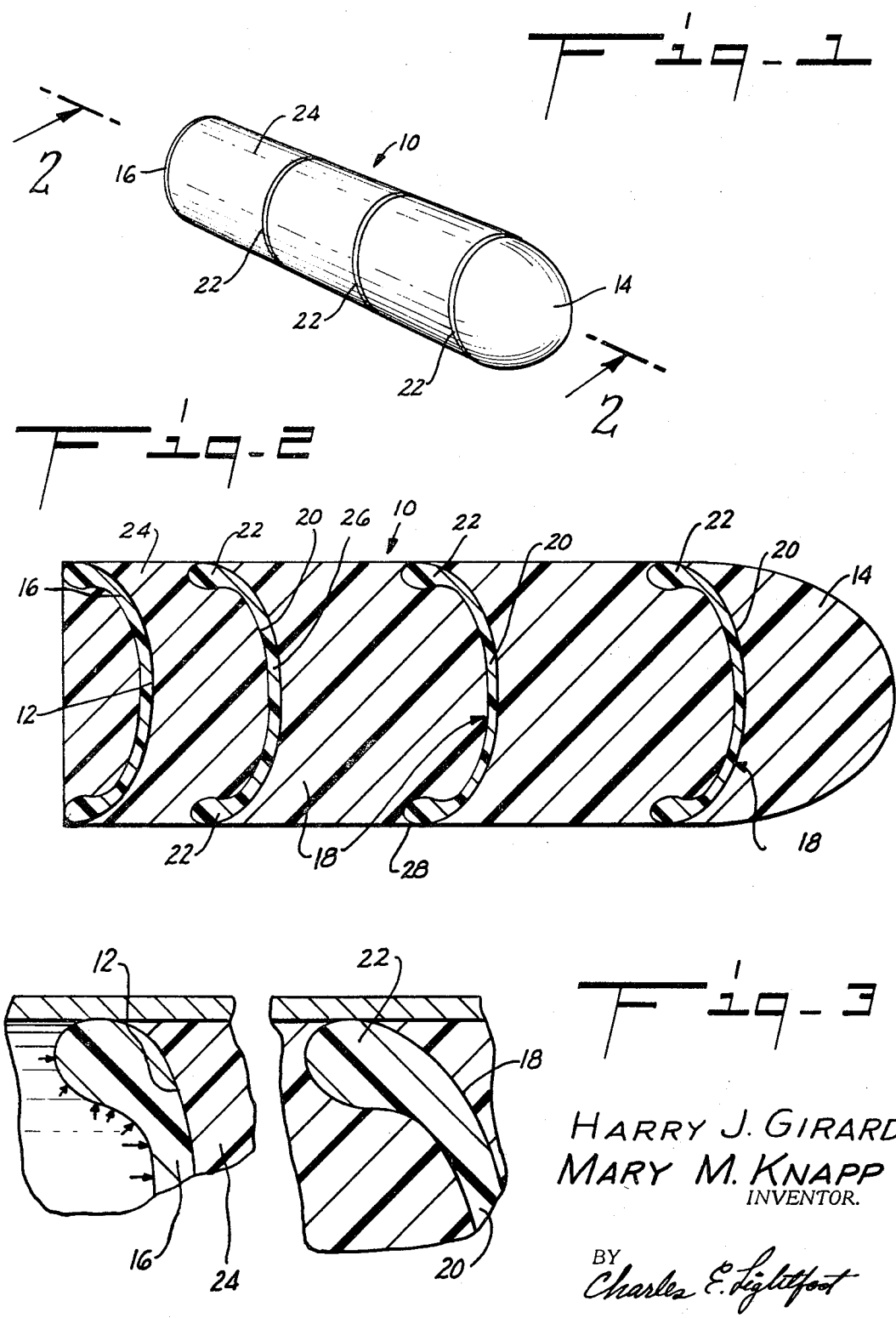

ABSTRACT OF THE DISCLOSURE

A pig or swipe for insertion in a pipeline to be propelled therethrough by a pressure gradient therein and having a body made up of cylindrical portions formed of resilient material, such as foamed plastic, arranged in end to end coaxial relation and between which flexible diaphragms or barrier layers are positioned. The diaphragms or barrier layers are formed with thickened and somewhat rounded, annular, peripheral portions positioned for sealing engagement with the surrounding wall of the pipe and are convex or generally cup shaped to be expanded into tight sealing engagement with the pipe by the pressure exerted by fluid in the pipe against the ends of the pig.

---

This invention relates to equipment for use in pipelines, and more particularly to a pig or swipe designed to be inserted in a pipeline to be propelled therethrough by a pressure gradient.

The invention is particularly useful in connection with the cleaning of the interior of pipelines and for the separation of different fluids which are to be transmitted therethrough.

In the operation of pipelines it is often necessary to transmit fluids of widely different character therethrough while preventing the commingling of such fluids. For this purpose it is customary to introduce into the line, upon termination of the introduction of one type of fluid and preliminary to the introduction of another type, a ball, pig or swipe, which forms a seal with the internal surface of the pipe and serves as a barrier between the fluids. Such pigs or swipes are also effective to wipe the pipe clean of one fluid in advance of the movement of another fluid through the pipe to effectively prevent contamination of one fluid by another.

Pipeline pigs or swipes are also useful for various other purposes, such as the removal of corrosion or other foreign material from the pipe and for the application of coatings to the internal wall of the pipe.

Various types of pigs or swipes have been commonly used for these purposes, such as, rubber balls, or those of a kind having a number of seal forming members connected together in longitudinally spaced relation and provided with sealing elements of the cup type. Under the conditions of usage encountered, such as passing through bends or elbows in the line or other irregularities therein, such as variations in the size of the pipe or internal roughness, pigs or swipes, as heretofore commonly constructed, are subject to wear which often results in the failure of the barrier between the fluids, such as by the formation of grooves or channels in the seal forming elements.

The present invention has for an important object the provision of a pipeline pig or swipe which is constructed to maintain an effective barrier between fluids in a pipeline and to withstand extreme conditions of wear and hard usage likely to be encountered therein without failure of the barrier.

Another object of this invention is to provide a pig or swipe for use in pipelines embodying seal forming means which is capable of expanding to compensate for wear during the use of the device, and including means for expanding the seal forming means to maintain a closed barrier against fluids in the line.

A further object of the invention is the provision of a pipeline pig or swipe comprising a compressible body of foamed plastic material having embedded therein longitudinally spaced seal forming means which are expansible in response to compression of the body into seal forming engagement with the surrounding pipe to form barriers against the flow of fluid past the pig.

Briefly described the pig or swipe of the invention comprises a generally cylindrical body made up of portions shaped to be arranged in end to end coaxial relation, formed of foamed plastic material, or other suitable resilient material and having seal forming means in the form of diaphragms or barrier layers positioned between adjacent ones of said portions for sealing contact with the surrounding wall of a pipe and which are constructed to expand in response to compression of the body to compensate for wear and to maintain a closed barrier against the flow of fluid past the body.

The above and other obvious advantages of the invention may best be understood from the following detailed description of a preferred embodiment thereof, when considered in conjunction with the annexed drawings, wherein—

FIGURE 1 is a perspective view illustration of a preferred embodiment of the pipeline pig or swipe of the invention;

FIGURE 2 is a cross-sectional view, on an enlarged scale, taken along the line 2—2 of FIGURE 1, looking in the direction of the arrows;

FIGURE 3 is a fragmentary, cross-sectional view, similar to that of FIGURE 2, on a greatly enlarged scale, showing portions of the pig or swipe of the invention in operating position in a pipeline and the manner in which the invention operates therein.

Referring now to the drawings in greater detail the pig or swipe of the invention comprises a body, generally designated 10, of generally elongated cylindrical shape, formed of suitable resilient material, such as foamed rubber, polyurethane foam, or the like, having a substantially concave rear end face 12 and a rounded or bullet shaped forward end 14. The rear end face 12 may be covered with an impervious plastic layer of coating 16 against which pressure is exerted by a fluid in the pipeline, as shown in FIGURE 3, when the device is in use.

The body 10 may, of course, be formed of any of various resilient materials, and for this purpose foamed polyurethane has been found to be particularly suitable, because of its great durability and resistance to wear, and also because it is easily molded.

Within the body 10 at suitably longitudinally spaced locations, seal forming means are provided, which preferably take the form of layers 18 of suitable flexible material, such as plastics to form diaphragms or barriers, positioned for sealing contact about their peripheries with the internal surface of the pipe to prevent the flow of fluid past or through the body. Each of the barries or diaphragms 18 is preferably formed with a central portion 20 which is relatively thin, and an annular, peripheral portion 22 which is of substantially greater thickness than the central portion 20 and which is of rounded shape, as shown in cross-section in FIGURES 2 and 3.

The rear faces of diaphragm or barrier members 18 are preferably concave, while the forward faces of the same are convex, so that upon compression of the body 10 by the application of pressure thereto by fluid in the pipe against the rear end face of the body, the diaphragms will be somewhat flattened or expanded to maintain a tight seal of the peripheral portions 22 against the internal surface of the pipe.

In making the pigs or swipes, a first body portion 24 may be formed by molding a foamed plastic material, such as polyurethane foam in a suitable mold, which, due to the character of the material will have a somewhat rounded or dome shape providing a forwardly convexed face 26 when the material has set or cured. A layer of suitable impervious plastic material, preferably un-foamed is then applied to the face 26, as by pouring the material into the mold on top of the body portion 24 therein, so that the material flows toward the periphery of the body to form the relatively thin central portion 20 of the diaphragm or barrier and the thickened peripheral portion 22.

A second body portion 28 is then cast on the forward face of the barrier layer of the first body portion, so that the second body portion has a rounded or convex forward face, and a second barrier layer or diaphragm is then poured onto the forward face of this second body portion.

In the same manner, any number of body portions may be cast to make up a body of any desired length, there being thus provided a number of barrier layers or diaphragms which are suitably spaced apart longitudinally of the body. The forward end of the body may be suitably rounded as shown in FIGURES 1 and 2 in any convenient manner, as by molding.

The pig or swipe of the invention will, of course, be of somewhat larger diameter than the internal diameter of the pipeline in which it is to be used, so that the pig will be considerably compressed on insertion into the line, whereby a tight seal will be formed with the interior of the pipe.

The body portions and the barrier layers or diaphragms may, of course, be molded or formed separately and assembled by the use of a suitable adhesive or cement.

The method of making the pigs thus comprises forming an elongated, generally cylindrical body of resilient material, such as foamed plastic having body portions formed at one end with a convex end face, and applying to such portions as by pouring onto said end faces a plastic material which flows to form barrier layers or flexible diaphragms between the ends of adjacent ones of said portions, each of which diaphragms has a relatively thin central portion and a thickened annular, peripheral portion located to sealingly engage the surrounding wall of a pipe to prevent the flow of fluid therein past the body.

In making use of the pig or swipe constructed as described above, the device is inserted into a pipeline, the body being compressed or squeezed into the pipe into seal forming engagement with the surrounding wall of the pipe. Fluid is then introduced into the pipe to create a pressure gradient therein to propel the same through the pipe. During such movement of the pig in the pipe the body 10 will be compressed longitudinally to apply pressure to the barrier layers of diaphragms tending to urge the peripheral portions 22 thereof into sealing contact with the surrounding pipe to compensate for wear on the body and prevent the flow of fluid past the body.

It will thus be seen that the invention provides a pipeline pig or swipe which is of simple and rugged construction and economical manufacture and by which a fluid tight seal may be maintained in a pipe between fluids in advance of and behind the pig, even under adverse conditions of wear and hard usage.

The invention is disclosed herein in connection with a particular embodiment of the same, which is intended by way of illustration only, it being evident that various changes can be made in the article as well as in the method by which the same is made, within the spirit of the invention and the scope of the appended claims.

Having thus clearly shown and described the invention, what is claimed as new and desired to secure by Letters Patent is:

1. In a pipeline swipe adapted to be propelled through a pipe by a pressure gradient,
an elongated body made up of generally cylindrically shaped portions formed of resilient material arranged in end to end coaxial relation and
barrier means formed of flexible, impervious material between the ends of adjacent ones of said portions and shaped for sealing engagement with the surrounding wall of a pipe to prevent the flow of fluid past the body.

2. The pipeline swipe as claimed in claim 1 wherein each of said portions has a convex end face.

3. The pipeline swipe as claimed in claim 1, wherein adjacent ones of said portions are formed one with a convex end face and another with a concave end face disposed adjacent to said convex face.

4. The pipeline swipe as claimed in claim 3 wherein each of said barrier means is positioned between the convex end face of one of said portions and the concave end face of the adjacent portion and is formed with a central, relatively thin portion and a thickened, annular, peripheral portion positioned for sealing engagement with the internal surface of the pipe.

5. The pipeline swipe as claimed in claim 1, wherein said body portions are formed of foamed plastic and said barrier means are formed of non-foamed plastic material.

References Cited
UNITED STATES PATENTS

| | | | |
|---|---|---|---|
| 1,668,438 | 5/1928 | Weis | 15—104.06 |
| 2,906,650 | 9/1959 | Wheaton | 15—104.06 X |
| 3,204,274 | 9/1965 | Knapp | 15—104.06 |

EDWARD L. ROBERTS, *Primary Examiner.*